United States Patent [19]

Stetson

[11] 4,134,146

[45] Jan. 9, 1979

[54] SURGE ARRESTER GAP ASSEMBLY

[75] Inventor: Earl W. Stetson, Pittsfield, Mass.

[73] Assignee: General Electric Company, New York, N.Y.

[21] Appl. No.: 876,480

[22] Filed: Feb. 9, 1978

[51] Int. Cl.[2] .................................................. H02H 9/06

[52] U.S. Cl. ....................................... 361/130; 315/36; 361/128

[58] Field of Search ........................ 361/128, 129, 130; 315/36; 313/217

[56] References Cited

U.S. PATENT DOCUMENTS

| | | | |
|---|---|---|---|
| 3,152,279 | 10/1964 | Misare | 315/36 X |
| 3,524,099 | 8/1970 | Stetson | 361/134 X |
| 3,619,708 | 11/1971 | Stetson | 361/128 X |

*Primary Examiner*—Harry E. Moose, Jr.
*Attorney, Agent, or Firm*—Francis X. Doyle; Richard A. Menelly

[57] ABSTRACT

Surge arrester spark gap assemblies for use within surge voltage arrester devices employ the gap electrode structure to direct the arc current flow.

16 Claims, 6 Drawing Figures

Fig.1.
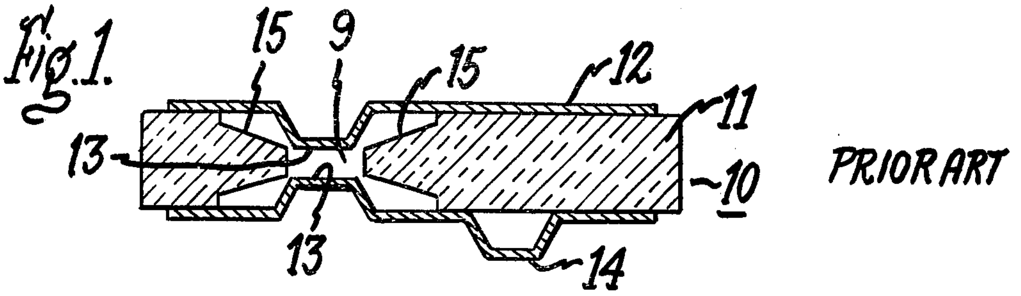
Fig.2.
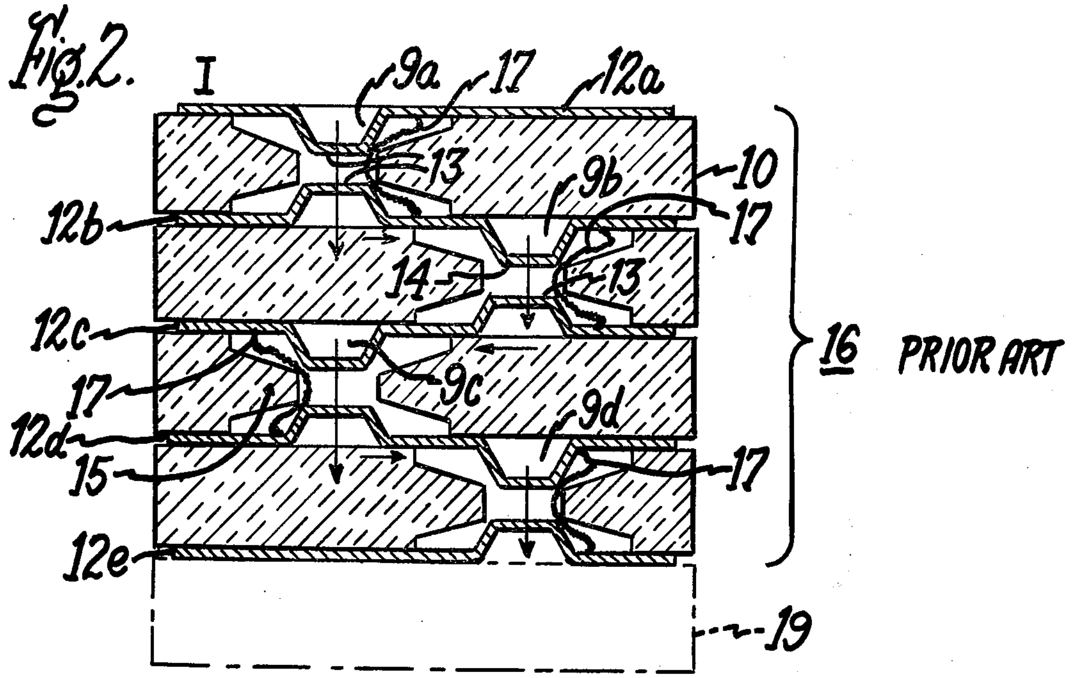
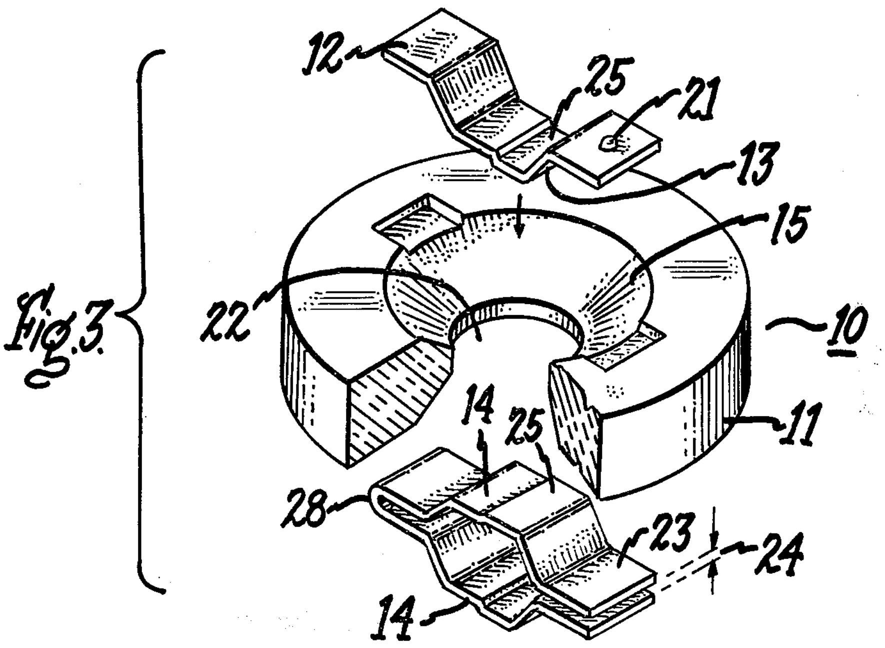
Fig.3.

SURGE ARRESTER GAP ASSEMBLY

FIELD OF THE INVENTION

This invention relates to voltage surge arrester devices and, in particular, to series gaps assemblies for use within the arresters.

BACKGROUND OF THE INVENTION

Voltage surge arresters of the type used for protecting electrical equipment from damaging voltage surges generally include a plurality of series gap devices to interrupt the power system follow current through the arresters. Spark gap assemblies are described in U.S. Pat. No. 3,619,708 and 3,524,099 and both of these patents are incorporated herein by way of reference.

The gap assemblies, within the aforementioned U.S. patents, not only serve to provide an open circuit to the lightning arresters in quiescent conditions but also serve to extinguish the arc which occurs when the arresters are caused to operate due to an overvoltage. One efficient method for rapidly extinguishing the arc which occurs is by magnetically directing the arc into contact with the insulating structure supporting the gap electrodes. The supporting structure may consist of a sintered porous aluminum oxide disc which serves to electrically insulate and set the gap electrode spacing and also to quench the arc. When the arc is forced into contact and permeates the aluminum oxide surfaces the arc becomes thermally cooled and rapidly loses energy. By forcing the arc to contact a plurality of the aluminum oxide surfaces the arc rapidly becomes extinguished.

With the continued rising cost of electrical power transmission and distribution, means are currently being investigated for reducing the cost and increasing the efficiency of the materials and the designs used.

The purpose of this invention is to provide an efficient surge arrester gap assembly at a substantial reduction in size and materials cost.

SUMMARY OF THE INVENTION

Surge arrester spark gap assemblies are provided in minaturized form having controlled electrical resistive properties integrally formed within the electrode structure. The integrally formed resistive path forces the arc to transport within the gap assembly in a predetermined manner for rapidly extinguishing the arc.

BRIEF DESCRIPTION OF THE DRAWINGS

FIG. 1 is a side sectional view of a prior art spark gap arrangement;

FIG. 2 is a side sectional view of an arrester gap assembly formed from the prior art assembly of FIG. 1;

FIG. 3 is an exploded perspective view of a partial spark gap assembly according to the invention;

GENERAL DESCRIPTION OF THE INVENTION

Figure 4:
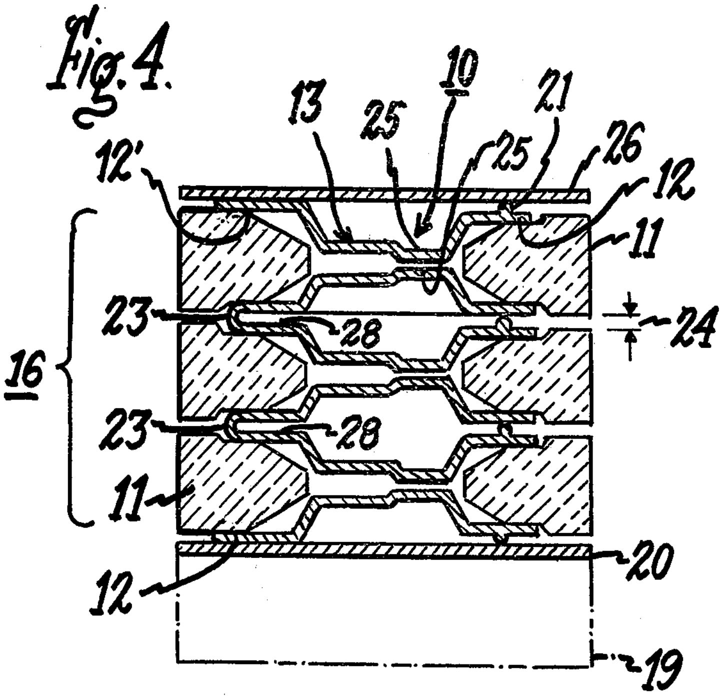
FIG. 4 is a side sectional view of a completed spark gap assembly employing the spark gaps of FIG. 3.

The operation of a series gap assembly can be understood by reference to the prior art arrester gap 10 of FIG. 1. A pair of electrodes 12 and 14 are separated by means of a sintered porous insulating disc 11 having an eccentric opening 9 for electrical access therebetween the electrodes 12 and 14. The electrodes further includes an inward projection 13 on both sides of disc 11 to provide accurate gap spacing therebetween. The type of arrester gap 10 described in FIG. 1 also includes an outward projection 14, the purpose of which will be described later. In operation upon the occurrence of a surge voltage occurring between the electrodes 12 and 14 an arc occurs between the projections 13 and the arrester gap 10 provides means for extinguishing the arc and restoring the arrester to an insulating condition. The insulating disc 11 is generally formed from a sintered porous structure of aluminum oxide and contains a frustoconical sectin 15 adjacent the electrode projections 13. The frustoconical section 15 porvides heat transfer from the arc when the arc is caused to come into contact with section 15.

FIG. 2 contains an arrester gap assembly 16 containing a plurality of the arrester gaps 10 described within FIG. 1. The plurality of arrester gaps 10 are electrically connected in series with a plurality of varistor discs the purpose of which is described in detail within the aforementioned U.S. patents. For the purpose of simplicity only, one varistor type disc 19 is shown in the embodiment of FIG. 2. The top electrode 12 of the assembly 16 is electrically connected with line and the current I is caused to transfer in the direction indicated by arrows as follows: Upon the occurrence of an arc between the electrode projections 13, current I transmits through electrode 12 to lower electrode *12b* having an outward electrode projection 14 and the next electrode *12c* having inward electrode projection 13. The arc 17 is magnetically forced to contact the frustoconical section 15 where part of the arc energy is absorbed by the method described earlier. The current I continues to the next electrode *12d*, as indicated, and a subsequent arc 17 is caused to move into contact with the adjacent conical section 15 and becomes further cooled and quenched in the process. The current I now proceeds through the bottom electrode *12e* and is electrically connected to the varistor disc 19. It is to be noted that the current path, as indicated, is caused to transfer in a zig-zag configuration. It is to be further noted that each successive opening, *9b*, *9c*, *9d* are offset from each other so that the current travels along each electrode *12a*, *12b*, *12c*, *12d*, *12e* to provide sufficient magnetic field to force each successive arc 17 into contact with each adjoining disc section 15.

DESCRIPTION OF THE PREFERRED EMBODIMENT

The arrester gap 10 of the invention can be seen by referring to FIG. 3 where specially-designed electrode 12 is separated from a complementary double electrode number 23 by means of insulating disc 11. The electrode 12 has a generally winged-shaped configuration including a projection 13 which extends within central hole 22. Further included within the structure of electrode 12 is a tip projection 21 and a step projection 25 as indicated. Both the tip projection 21 and the step projection 25 are critical to the arrester and their function will be described in detail below. The double electrode 23 contains a pair of outward projection 14 a connector portion 28 and a gap portion 24. On the surface of both outward projections 14 are extended step portions 25 and the positioning of the step portions 25 and connector portions 28 for each successive double electrode 23 in an arrester gap assembly is critical.

An assembled gap assembly is shown in FIG. 4 wherein a top disc 26 is electrically connected with line on one side and with the top electrode 12 as indicated. The tip projection 21 contacts the disc 26 at a single point whereas the opposite electrode flat portion 12′ contacts the electrode 26 directly. Since the tip electrode projection 21 provides a point contact with disc 26 the contact resistance at the point of contact is quite high relative to the large surface contact area between the flat portion 12′ and disc 26. The purpose of the tip projection 21, therefore, is to provide a very high resistance path to current transferring from disc 26 to within the arrester gap assembly 16.

The arrester gap assembly 16 consists of a plurality of arrester gaps 10 in an electrical series arrangement. The top arrester gap 10 contains an insulating disc 11 and a single electrode 12 at one end having a projection 13 and a step portion 25. Interposed between each succeeding disc 11 is a double electrode structure 23 positioned such that the step portions 25 of the double electrode 23 are located opposite each other. The pair of opposing steps 25 provide a very short gap for the arc to occur therebetween. Each succeeding double electrode 23 is positioned such that the connector portions 28 are located one beneath the other in vertical alignment, and each successive gap portion 24 is also in vertical alignment. Once the arc occurs across the raised step portions 25 between single electrode 12 and the first double electrode 23 the arc current then proceeds through the assembly by means of connector portions 28 and step portions 25 in each succeeding arrester gap 10 throughout the gap assembly 16. The lower most single electrode 12 connects with the first nonlinear varistor disc 19 by mechanically contacting with disc electrode 20.

Figure 5:
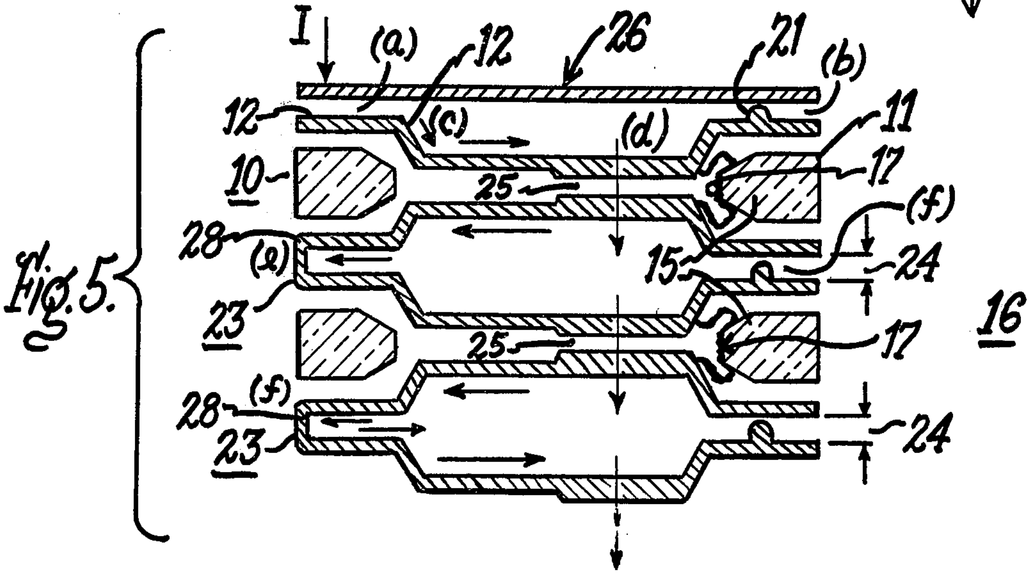
FIG. 5 is an enlarged side sectional exploded view of the spark gap assembly of FIG. 4 including current path directional arrows.

The electrical conduction path for the arrester gap assembly 16 of FIG. 4 is shown as an exploded view in FIG. 5. When the arrester gaps 10 of gap assembly 16 are sparked over by an overvoltage, current I will flow from top disc 26 into the first electrode 12 at contact area indicated as a. The current path is designed to transmit through the electrode 12 at region a since the contact resistance provided by tip electrode 21 at b is extremely large in comparison. Current I proceeds through the electrode 12 from c to d where an arc occurs across the step portions 25 which is the closest discharge gap existing between electrodes. Current then proceeds across the aforementioned discharge gap along the direction indicated by arrows to point E and provides a magnetic force that causes the arc 17 to move into and contact the conical section 15 of disc 11 in a manner similar to that described for the embodiment of FIG. 2. The arc 17 is magnetically driven into aluminum-oxide disc structure 11 and becomes thermally cooled in the process. The current I then proceeds to point f in the second double electrode 23.

Figure 6:
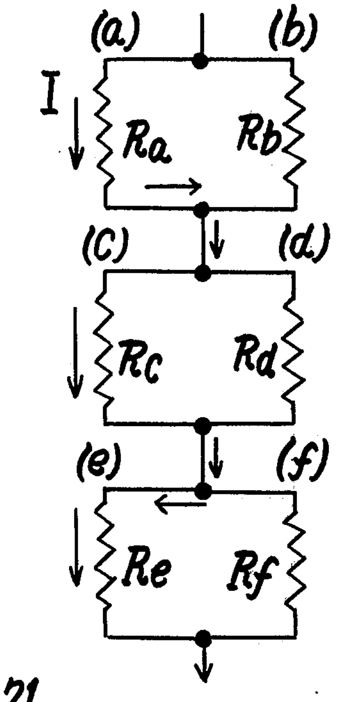
FIG. 6 is an equivalent circuit displaying the current transfer through the embodiment of FIG. 5.

Comparing the arrester gap 10 of FIGS. 3 and 4 with that of the prior art embodiment of FIG. 2, it is readily apparent that the embodiment of FIG. 4 is substantially smaller than that of FIG. 2 since both figures are to scale. The reason for the substantial decrease in size with the embodiment according to the invention is the integrated resistance built into the electrode structure that permits a concentrically arranged opening such as 22 in FIG. 3 to be used rather than the zig-zag configuration of excentric openings indicated within the embodiment of FIG. 2. The equivalent circuit relationship for the current flow path indicated in FIG. 5 is shown in FIG. 6. The current I proceeds from contact disc 26 in FIG. 5 to the first single electrode 12 within gap structure 10. The resistance offered to the current flow path at point A is that indicated as $R_a$ which is a minimum contact resistance equivalent to a short circuit in relation to the resistance presented at B due to the very high contact resistance offered by the tip electrode 21 indicated as $R_b$. Similarly, the resistances $R_c$ and $R_e$ are very low in comparison to $R_d$ and $R_f$ respectively and the major current path is indicated by the arrows. Of course, a very small percentage of the current does flow through $R_b$, $R_d$, and $R_f$ but this current is not high enough to alter the magnetic forces generated by the major current path through $R_a$, $R_c$, and $R_e$.

The use of the particular electrode structure containing therein high- and low-resistive properties permits the size of the insulating disc 11 and electrode 12 to be substantially reduced over that of prior art design. Although the contact resistance element is provided by tip projection 21, as shown for example in FIG. 3, high-contact resistance can also be provided by a layer of high-resistance material, or by a thin sheet of insulation material such as mica.

Instead of the provision of steps 25 to facilitate the occurrence of an arc on the projection 13 of electrode 12, a layer of insulating material may be used. Although sheet insulation can be employed it is preferred to use the tip structure 21 and step portion 25 for reasons of economy and efficiency.

Although the spark gap electrode structure of the invention is described for use within surge arrester application for lightning protection purposes, this is by way of example only. The gap electrode structure of the invention finds application wherever series gaps are to be employed within surge arresters for any application whatsoever.

I claim:

1. A spark gap assembly for a surge voltage arrester comprising:

a single electrode having a flat projection surface thereon for defining an extended arcing surface and a pair of flat contact surfaces thereon, one of said contact surfaces, including high-electrical resistive means for limiting current flow to said one surface;

a double electrode structure having a first pair of opposing flat contact surfaces on one side and a second pair of flat opposing contact surfaces on another side thereof, a pair of flat projected surfaces for defining arcing surfaces, said first pair of contact surfaces being electrically coupled together; and a disc of electrically insulating material separating said single electrode structure and said double electrode structure and providing arc quenching means therebetween said electrodes.

2. The spark gap structure of claim 1 further including an extending step portion on the projection of said single electrode for enhancing arc occurrence upon said projection.

3. The series gap structure of claim 1 wherein said resistive means comprises a tip extension on one of said flat contact surfaces for providing electrical contact resistance therewith said one contact surface.

4. The series gap structure of claim 1 wherein each projected surface on the pair of projections on the double electrode structure contains extended step portions for enhancing arc occurrence upon the extension.

5. The series gap structure of claim 1 wherein the other pair of contact surfaces are separated by an air gap.

6. The series gap structure of claim 1 wherein the insulating disc further includes a centrally located passage.

7. The series gap structure of claim 6 wherein the insulating disc further includes a frustoconical section extending within said central opening for providing an arc quenching surface.

8. The series gap structure of claim 7 wherein said insulating disc comprises pourous aluminum oxide.

9. The series gap structure of claim 1 wherein said resistive means comprises a resistive coating on said one electrode contact surface.

10. The series gap structure of claim 1 including a resistive coating on at least one part of the projection.

11. The series gap structure of claim 1 further including at least an additional double electrode structure juxtapositioned with said first double electrode structure for providing further arcing surfaces to said series gap structure.

12. The series gap structure of claim 11 further including an additional insulating disc intermediate said first and second double electrode structures.

13. The series gap structure of claim 11 wherein said additional double electrodes structure contain an additional electrical connection between first and second pairs of opposing contact surfaces and an air gap between another pair of first and second opposing contact surfaces.

14. The gap electrode structure of claim 13 wherein the electrical connection within said second double electrode structure is in vertical alignment with the electrical connection within said first double electrode structure and wherein the air gap in said second double electrode structure is in vertical alignment with the air gap in said first double electrode structure.

15. The series gap structure of claim 12 wherein the second insulating disc is concentrically aligned with said first insulating disc.

16. The series gap structure of claim 11 further including another single electrode structure for defining a current path between said one other double electrode.

* * * * *